(12) United States Patent
Gretz

(10) Patent No.: US 6,863,251 B1
(45) Date of Patent: Mar. 8, 2005

(54) GARDEN POST WITH WHILE-IN-USE COVER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 242 days.

(21) Appl. No.: 10/328,294

(22) Filed: Dec. 23, 2002

Related U.S. Application Data

(63) Continuation-in-part of application No. 10/253,185, filed on Sep. 24, 2002, now Pat. No. 6,585,221, which is a continuation-in-part of application No. 10/112,563, filed on Mar. 28, 2002, which is a continuation-in-part of application No. 09/860,064, filed on May 17, 2001.

(51) Int. Cl.⁷ ............................................. F21V 13/00
(52) U.S. Cl. ...................... 248/156; 248/530; 248/545; 248/85; 248/87; 312/431
(58) Field of Search ................................ 248/156, 530, 248/87, 85, 545; 362/431; 174/38

(56) References Cited

U.S. PATENT DOCUMENTS

| | | | | |
|---|---|---|---|---|
| 3,257,496 A | * | 6/1966 | Hamilton | 174/38 |
| 3,435,124 A | * | 3/1969 | Channell | 174/38 |
| 3,585,456 A | * | 6/1971 | Phillips, Jr. | 317/112 |
| 3,652,779 A | * | 3/1972 | Grinols | 174/38 |
| 3,868,474 A | * | 2/1975 | Bunten | 174/38 |
| 4,025,825 A | * | 5/1977 | Shrader | 361/374 |
| 4,076,198 A | * | 2/1978 | Garrett | 248/49 |
| 4,266,266 A | | 5/1981 | Sanner | |
| 4,519,657 A | * | 5/1985 | Jensen | 339/15 |
| 4,546,418 A | * | 10/1985 | Baggio et al. | 362/85 |
| 4,858,877 A | * | 8/1989 | Carter | 248/545 |
| 4,951,182 A | * | 8/1990 | Simonson et al. | 362/145 |
| 5,184,279 A | * | 2/1993 | Horn | 361/356 |
| 5,404,266 A | | 4/1995 | Orchard et al. | |
| 5,586,742 A | * | 12/1996 | Carter | 248/545 |
| 5,773,760 A | | 6/1998 | Stark et al. | |
| 5,820,968 A | * | 10/1998 | Kurani | 428/137 |
| D417,293 S | * | 11/1999 | Carter | D25/133 |
| 6,260,314 B1 | * | 7/2001 | Church et al. | 52/170 |

* cited by examiner

Primary Examiner—Korie Chan
Assistant Examiner—Steven Marsh

(57) ABSTRACT

A support for mounting and supporting electrical fixtures and electrical devices in an outdoor setting. The support includes an elongated body that is typically molded in one piece from a plastic material. Stabilizer bars are provided on the lower end of the body to provide firm anchoring in the ground. The stabilizer bars are integral with the body to reduce the possibility of separation from the body. A wide cable entryway is provided on the bottom of the body to accept electrical feed cables at various depths in the ground. The body includes a closed top, four side walls, and at least one access opening within one of the side walls. The hollow interior of the body can be closed off at any location desired between the access opening and the top edge of the cable entryway to form an integral electrical junction box for housing interior electrical connections. A flange projects beyond the outer wall around the access opening. The closed top of the body is adapted to accept a lighting fixture and the access opening is adapted to accept a standard wall-mounted electrical device, such as a duplex receptacle. The standard electrical device is held in the access opening by a standard faceplate. A cover is hinged to the body and includes bottom openings for electrical cords and a locking arrangement for locking the cover to the body. The mounting device therefore provides, in a minimal number of separate pieces, a stable platform for mounting an electrical fixture and an electrical receptacle to the ground. All wiring connections are enclosed in an electrical junction box. A hinged cover is provided that may be closed over installed electrical cords while they are attached to the receptacle to protect the cords and the receptacle from rain.

22 Claims, 8 Drawing Sheets

GARDEN POST WITH WHILE-IN-USE COVER

This application is a Continuation-In-Part of U.S. patent application Ser. No. 10/253,185 entitled "Garden Post", filed Sep. 24, 2002 now U.S. Pat. No. 6,585,221, which in turn is a Continuation-In-Part of U.S. patent application Ser. No. 10/112,563 entitled "Outdoor Garden Post", filed Mar. 28, 2002 and still pending, which in turn is a Continuation-In-Part of U.S. patent application Ser. No. 09/860,064 entitled "Landscape Fixture Support Post", filed May 17, 2001 and still pending.

FIELD OF THE INVENTION

The present invention relates to the field of outdoor ground-level supports for fixtures and electrical devices, and more particularly to a stable, inexpensive support that includes a cover for protecting an installed electrical device, such as a duplex receptacle, and the electrical cords connecting thereto.

BACKGROUND OF THE INVENTION

Homeowners often desire having the convenience of lighting and electrical service in outdoor areas, such as along walkways or around decks, swimming pools, or similar structures. Typically, homeowners have had to install the electrical service and lighting separately, each in its own housing or enclosure.

U.S. patent application Ser. No. 09/860,064, entitled "Landscape Fixture Support Post", filed May 17, 2001 by the inventor of the present invention and incorporated herein by reference in its entirety, disclosed a mounting device for mounting a lighting fixture in an outdoor setting. The mounting device included a hollow cylindrical post easily molded of plastic. The lower portion of the post included integral radial projections to enable easy anchoring in the ground and a wide entryway for electrical supply cable. The radial projections, being integral with the post body, were less likely to separate from the post than stabilizer devices held by fasteners, as is typical of prior art posts. The post provided a top fitting for mounting a light fixture and a side port to provide access to the interior of the post for completing wiring connections.

U.S. patent application Ser. No. 10/112,563, entitled "Outdoor Garden Post", filed Mar. 28, 2002 by the inventor of the present invention and incorporated herein by reference in its entirety, improved upon the design of an outdoor mounting device by providing an electrical junction box having a top wall and four side walls integral with the post. The mounting device provided a secure junction box for mounting an electrical device, such as an outlet receptacle in addition to a lighting fixture. Wiring connections to both the electrical device and the lighting fixture could therefore be completed within a secure electrical junction box. By isolating the internal wiring connections to both the device and fixture within a secure junction box, the wiring connections were thus better protected from ground moisture and other environmental hazards. The mounting device also enabled the junction box to accept all standard wall-mounted electrical devices, increasing its functionality.

U.S. patent application Ser. No. 10/253,185, entitled "Garden Post", filed Sep. 24, 2002 by the inventor of the present invention and incorporated herein by reference in its entirety, improved upon the functionality of the outdoor garden post by disclosing a mounting device for mounting a fixture at a user-selectable height in an outdoor setting. The mounting device was modular in nature, with the installer able to add various modules to raise the height of a light fixture and electrical device to a desired level. The mounting device also included a secure electrical junction box for enclosing and protecting wiring connections.

Although all of the aforementioned disclosures improved upon prior art devices for mounting lighting fixtures in an outdoor setting, the mounting device is not optimized for those instances in which a homeowner wishes to keep an electrical cord installed in a receptacle for an extended period of time. For example, Although U.S. patent application Ser. No. 10/253,185 provides a secure electrical junction box for enclosing wiring connections; over an extended period of time it is possible that rainwater could enter the junction box through the openings of the installed electrical receptacle. What is needed therefore, is a mounting device that protects an installed receptacle, and any electrical cords inserted therein, from rain and other environmental conditions. Additionally, the mounting device should provide the improved features of the aforementioned disclosures, including a secure electrical junction box for isolating wiring connections from environmental hazards, integral projections to improve anchoring to the ground, a wide lower cable entryway to allow easy access for underground cables. The mounting device should also be stable, durable, inexpensive to manufacture, easy to install, and easy to maintain.

ADVANTAGES OF THE INVENTION

The present invention overcomes many of the deficiencies of the prior art. It provides an outdoor mounting device that protects an installed electrical receptacle and electrical cords connected thereto from rain and other water such as that from lawn irrigation systems. The mounting device can be easily anchored in the ground. A weatherproof electrical junction box is provided for containing and protecting wiring connections. The junction box provided is an Underwriters Labs (UL) listed box that provides for easy mounting of standard wall-mount type electrical devices, such as electrical receptacles and switches.

The mounting device provides an arrangement for easily mounting a light fixture. Either low voltage or line voltage fixtures may be used.

Additionally, the fixture-mounting device is stable, durable, easily maintained and accessed after installation, and is easy and inexpensive to manufacture.

These, and other advantages, will become readily apparent to one of skill in the art after reviewing the following disclosure.

BRIEF DESCRIPTION OF THE INVENTION

The present invention comprises a mounting device for securing electrical devices to the ground. The mounting device includes an elongated body that is typically molded in one piece from a plastic material. Stabilizer bars provided on the lower end of the body are integral with the body to reduce the possibility of separation from the body and also enable secure anchoring in the ground. A wide cable entryway is provided on the bottom of the body to accept electrical feed cables at various depths in the ground. The body includes a closed top, four side walls, and at least one access opening within one of the side walls. The hollow interior of the body can be closed off at any location desired between the access opening and the top edge of the cable entryway to form an integral electrical junction box for housing interior electrical connections. A flange projects beyond the outer wall around the access opening. The closed top of the body is adapted to accept a lighting fixture and the access opening is adapted to accept a standard wall-mounted electrical device, such as a duplex receptacle. The standard electrical device is held in the access opening by a standard faceplate. A cover is hinged to the body and includes bottom openings for electrical cords and a locking arrangement for locking the cover to the body. The mounting device therefore provides, in a minimal number of separate pieces, a stable platform for mounting an electrical fixture and an electrical receptacle to the ground in a manner that encloses electrical wiring connections in an electrical junction box and includes a hinged cover that may be closed over installed electrical cords to protect the cords and the receptacle therein from rain and other sources of water.

REFERENCE NUMERALS USED IN THE SPECIFICATION AND DRAWINGS

20—support
22—body
24—side walls
26—closed top
28—open bottom
30—stabilizer bar
32—topmost extent of bottom opening
34—side opening
36—electrical junction box
38—closure panel
40—aperture in closed top
42—electrically conductive bushing
44—peripheral flange
46—moveable cover
48—hinge arrangement
50—bottom apertures in cover
52—vertical component of stabilizer bar
54—horizontal component or stiffening rib
56—base of stabilizer bar
58—distal end of stabilizer bar
60—fillet
62—post
64—ears
66—apertures in ears
68—snap lock tab
70—aperture in stabilizer bar
72—cable entryway
73A—bottom side of closure panel
73B—top side of closure panel
74—knockout
75—half-moon shaped cutouts
76—thin-walled section
77—lip
78—panel boss
79—gap
81—coaxial apertures
82—tab
83—apertures in device boss
84—alternate location of closure panel
86—integral tab on cover
88—aperture in tab
90—cable
92—ground
94—light fixture
96—cable wiring leads
98—fixture wiring leads
100—electrically conductive nut
102—grounding lug
104—ground wire
106—duplex receptacle
108—rebar
110—bosses
112—fasteners
114—gasket
116—faceplate

DETAILED DESCRIPTION

Figure 1:
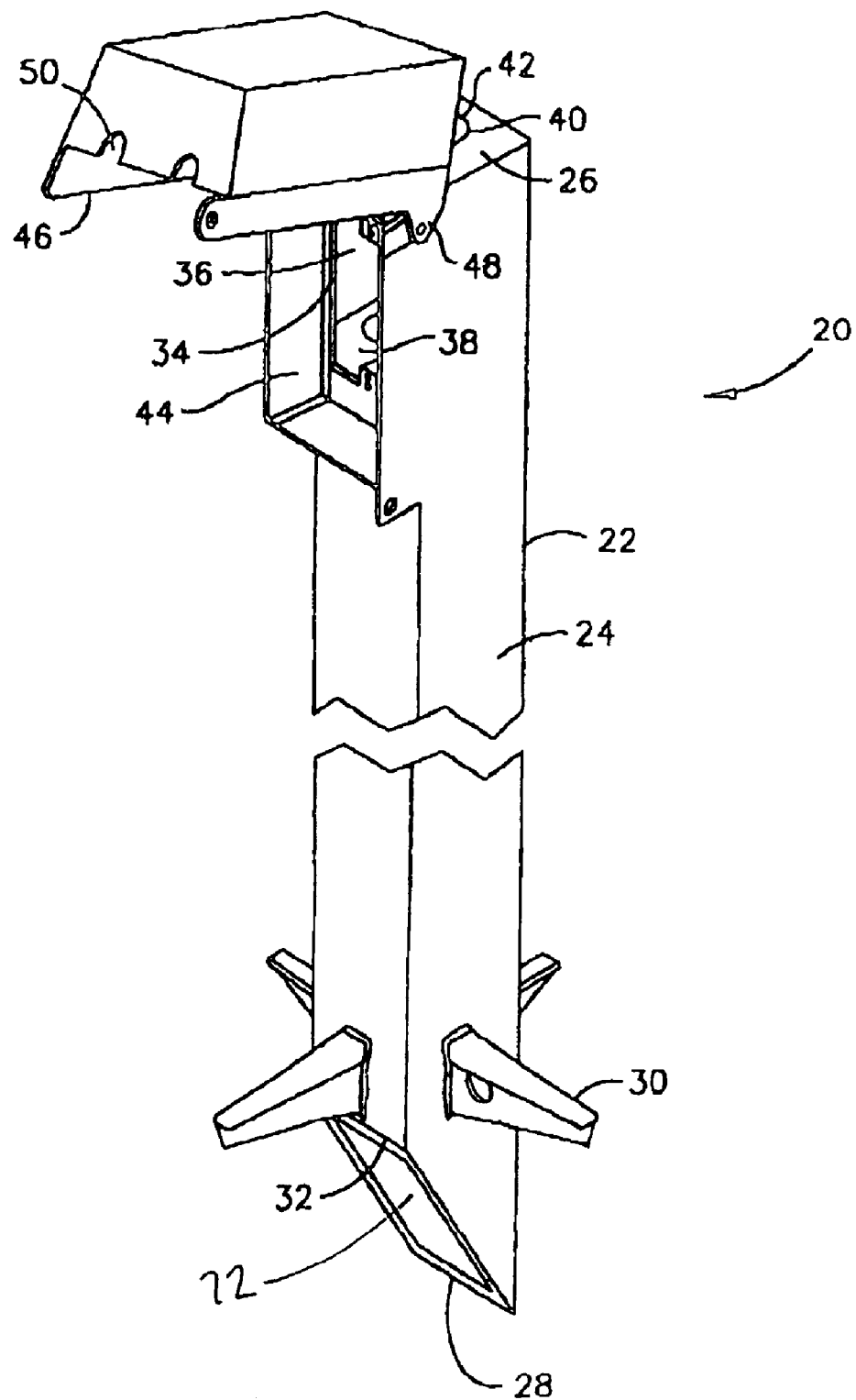
FIG. 1 is a perspective view of a preferred embodiment of the support for electrical fixtures and devices according to the present invention.

With reference to FIG. 1, a perspective view is shown of a preferred embodiment of the support for electrical fixtures and devices according to the present invention. The support 20 consists of a rigid, hollow, elongated body 22 that is typically molded in one piece of a plastic material. The body 22 includes side walls 24, a closed top 26, and an open bottom 28. The open bottom 28 is formed by the side walls 24 being formed along an angled plane that is preferably between 20 and 40 degrees with respect to the side walls 24. Stabilizer bars 30 are typically integral with the body 22 and project outwardly from the side walls 24 at or slightly above the topmost extent 32 of the bottom opening 28. The preferred embodiment of the support 20 includes at least one side opening 34 in at least one of the side walls 24. An integral electrical junction box 36 is formed adjacent the side opening 34 by the closed top 26, side walls 24, and a closure panel 38 that is secured to one of the side walls 24 of the hollow body 22. Additionally, the closed top 26 of the support 20 includes an aperture 40 and an electrically conductive bushing 42. A peripheral flange 44 surrounds the side opening 34 and extends substantially from the side wall 24. A moveable cover 46, secured to the peripheral flange 44 by a hinge arrangement 48, is shown in FIG. 1 in its open position. The cover 46 includes bottom apertures 50 the purpose of which will be explained herein.

Figure 2:
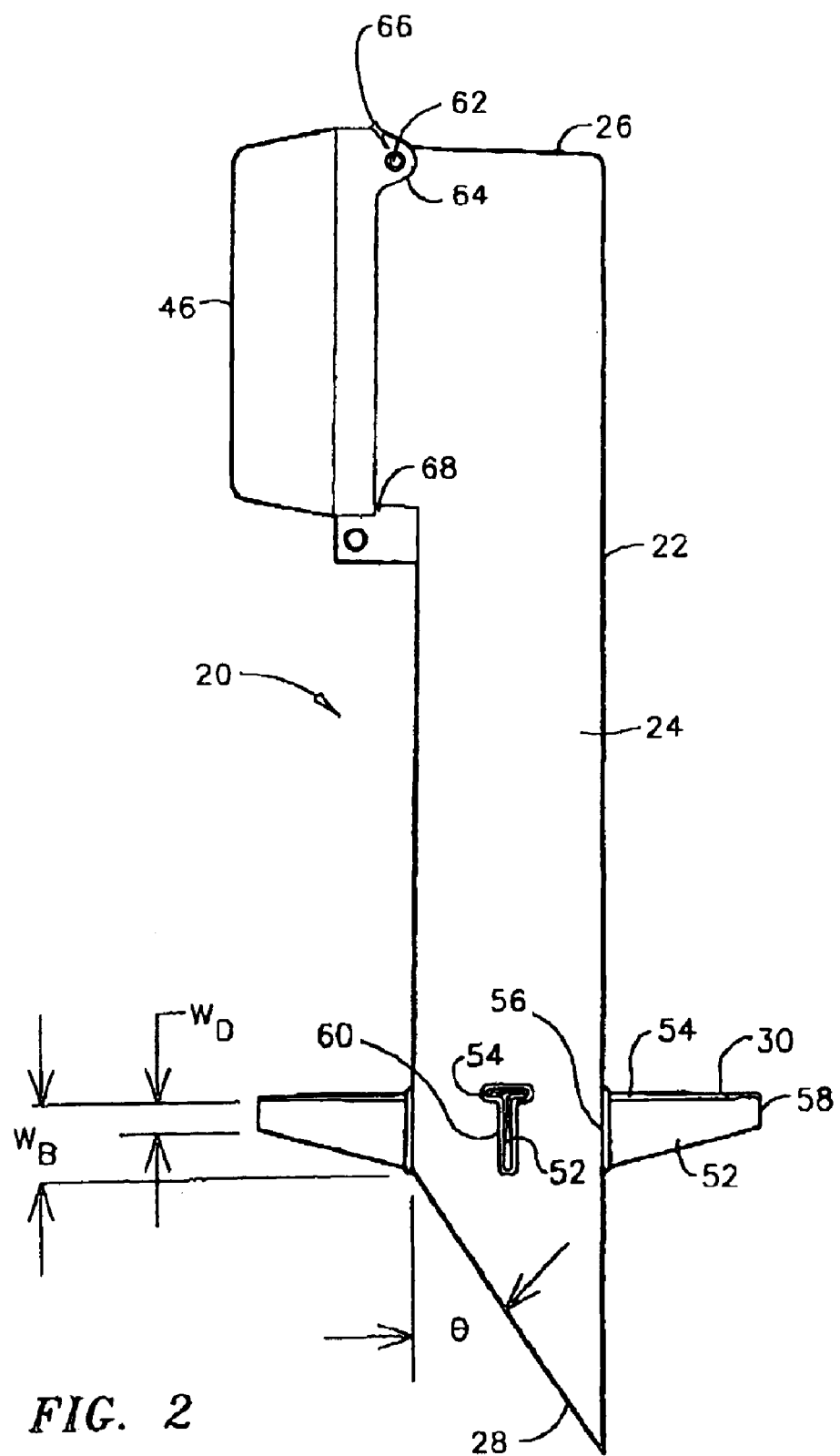
FIG. 2 is a side view of the support of FIG. 1.

Referring to the side view of the preferred embodiment of the support 20 in FIG. 2, the stabilizer bars 30 include a vertical component 52 and a horizontal component 54. The horizontal component 54 acts as a stiffening rib for bracing and stiffening the stabilizer bars 30. The stabilizer bars 30 include a base 56 at their juncture with the side walls 24 and a distal end 58 at their furthest extent from the elongated body 22. Fillets 60, formed during the injection molding of the elongated body 22, are typically provided around the periphery of the base 56 of each stabilizer bar 30 to further strengthen them. The hinge arrangement 48 for opening and closing the moveable cover 46 includes posts 62 extending from opposing sides of the peripheral flange 44, one of which is in view in FIG. 2, and ears 64 having apertures 66 that align with the posts 62. The cover member 46 is typically molded in one piece of plastic and is flexible enough to be spread slightly allowing the apertures 66 in the ears 64 of the cover 46 to snap over the posts 62 on the peripheral flange 44 of the support 20. A snap lock tab 68 is provided on the bottom of the cover 46 that allows snap fitting of the cover to the body 22 when the cover is closed thereon.

Figure 3:
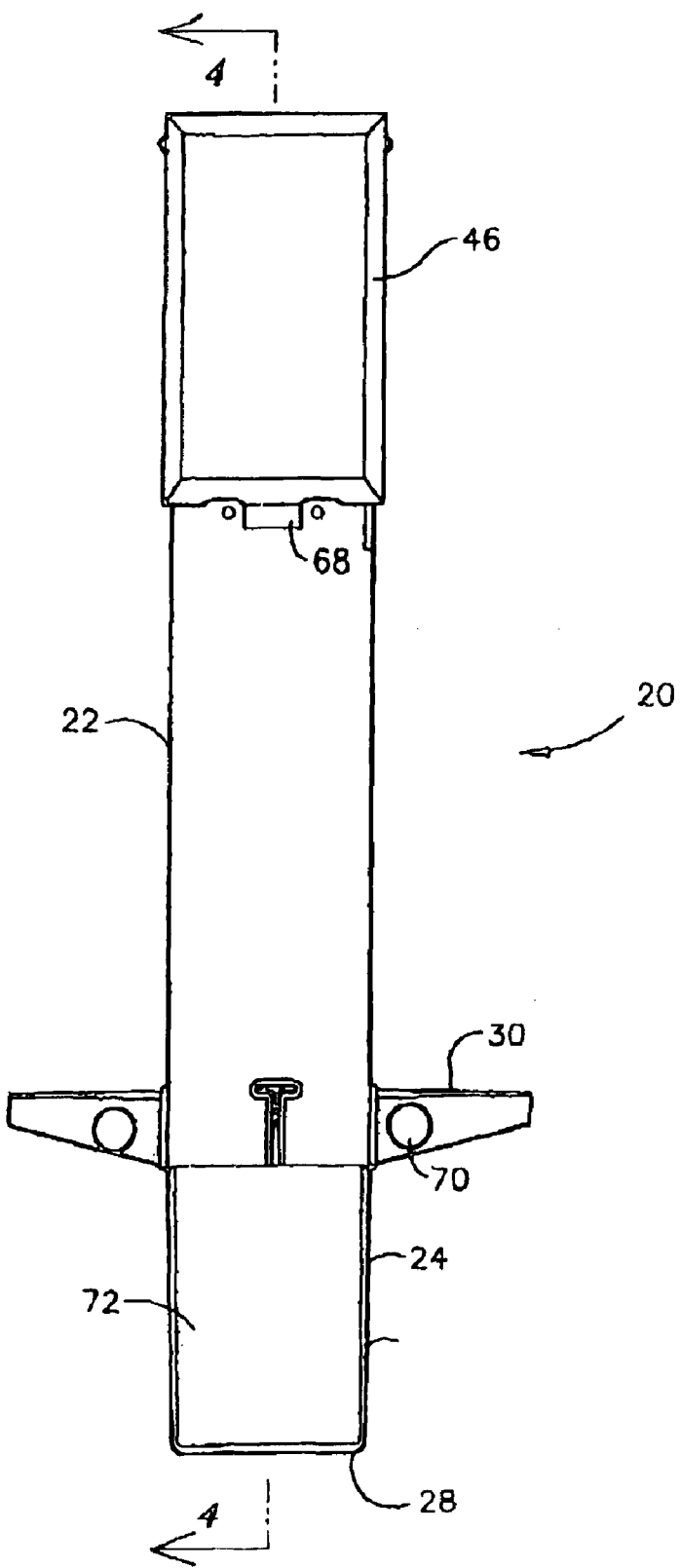
FIG. 3 is a front view of the support of FIG. 1.

As shown in the front view of the support 20 in FIG. 3, the stabilizer bars 30 may include apertures 70 as shown. The open bottom 28 of the support 20 includes a wide cable entryway 72 formed by the side walls 24 being formed at a sharp angle.

Figure 4:
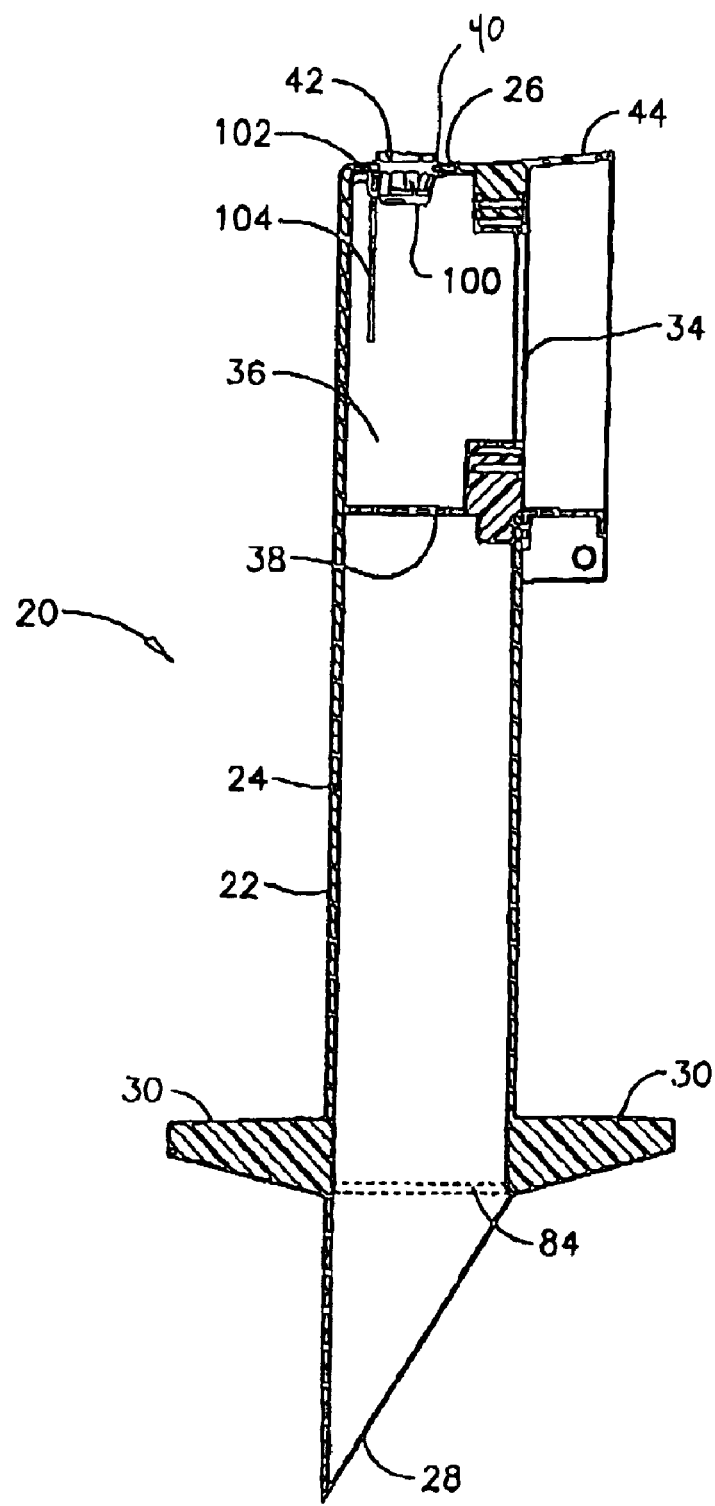
FIG. 4 is a sectional view taken along line 4—4 of FIG. 3.
Figure 5:
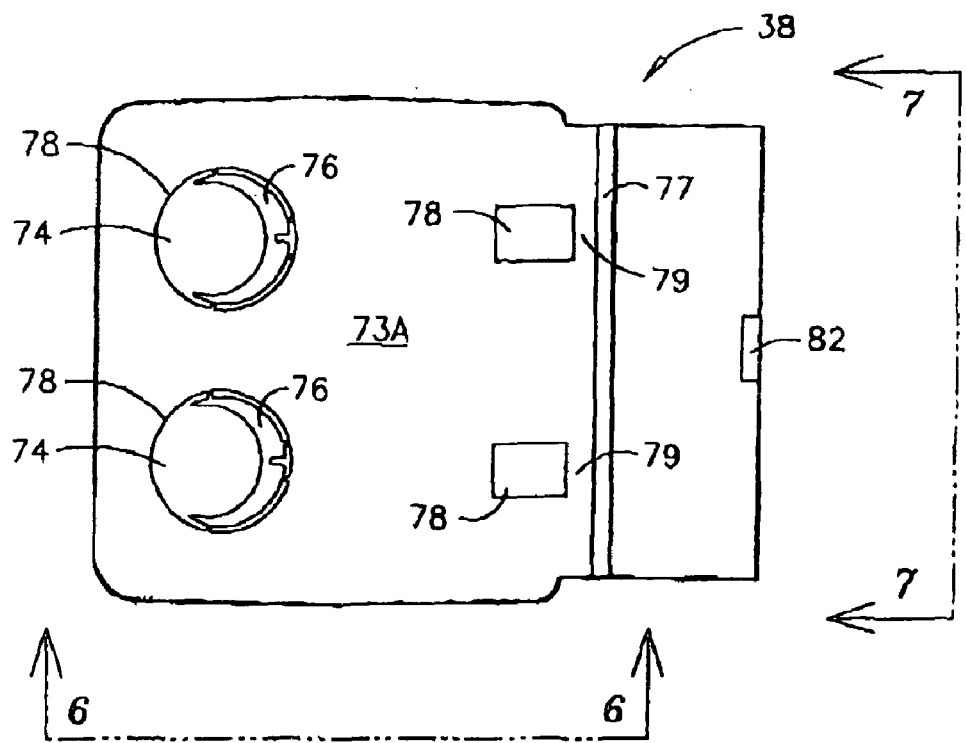
FIG. 5 is a plan view of a preferred embodiment of a closure panel according to the present invention, as viewed from the bottom of the panel as mounted in the support shown in FIG. 4.
Figure 6:
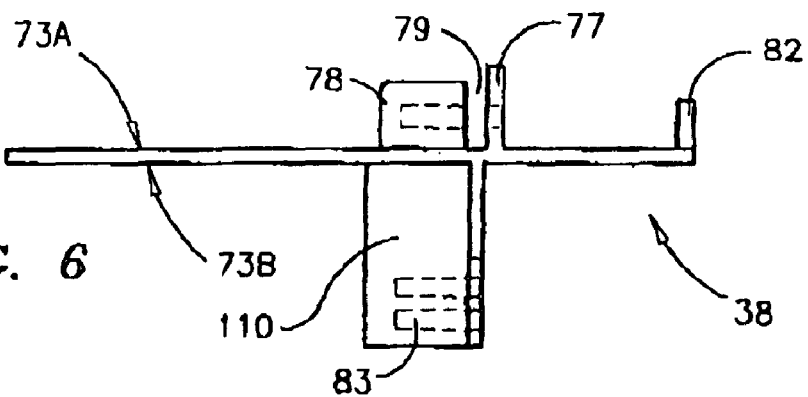
FIG. 6 is a side view of the closure panel taken along line 6—6 of FIG. 5.
Figure 7:
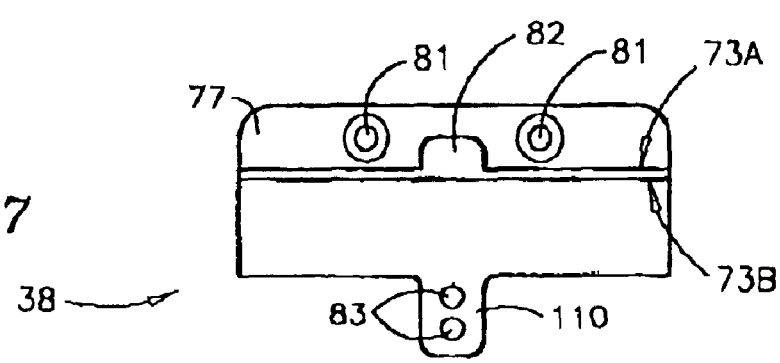
FIG. 7 is an end view of the closure panel taken along line 7—7 of FIG. 5.

The closure panel 38, as shown in FIGS. 5–7, is typically formed of the same rigid plastic material as the body of the support (not shown) and typically includes knockout areas 74. The plan view of FIG. 5 depicts the bottom side 73A of the closure panel 38. The knockout areas include half-moon shaped cutouts 75 and thin-walled sections 76 as shown. The half-moon cutouts 75 provide a passageway for small diameter cable (not shown) to be passed there through. If wide cable, such as armored cable, is used with the support of the present invention, the knockout 74 is typically widened by knocking out one or more thin-walled sections 76. A lip 77 and two panel bosses 78 extend from the bottom side 73A of the closure panel 38 forming a gap 79 there between. A device boss 10 extends from the top side 73B of the closure panel 38 as shown. Coaxial apertures 81 are provided through the lip 77 and the panel bosses 78 for receipt of fasteners (not shown) for securing the closure panel 38 to the support (see FIG. 4). A tab 82 is provided on the bottom side 73A of the closure panel 38 as shown to engage the snap lock tab on the cover member (not shown) when the cover is closed thereon. Apertures 83 are provided in the electrical device boss 110 to receive fasteners (not shown) for later attaching an electrical device within the support.

Referring to FIG. 4, the closure panel 38 is typically secured to the body 22 at the lower end of the side opening 34 as shown to typically form a standard size electrical junction box 36. Typically, the elongated body 22 includes apertures in the side wall 24 at the lower end of the side opening 34 that align with the coaxial apertures (not shown) in the closure panel 38. The closure panel is simply held in place by fasteners (not shown) secured through the apertures in the closure panel 38 and the side wall 24. Alternatively, a bottom closure 38 may be secured within the interior of the hollow body 22 just above the open bottom 28, in an alternate location 84 shown in phantom lines, of the body 22 to create a long electrical junction box. With a closure 38 secured at the bottom of the body 22 to form a long electrical junction box (not shown), it should be understood that additional side openings could be provided (not shown) in the side walls 24 to enable installation of additional electrical devices, such as receptacles, switches, timers, photocells, etc.

Figure 10:
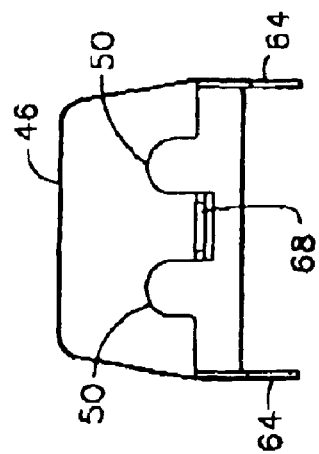
FIG. 10 is a bottom view of the cover member taken along line 10—10 of FIG. 8.
Figure 9:
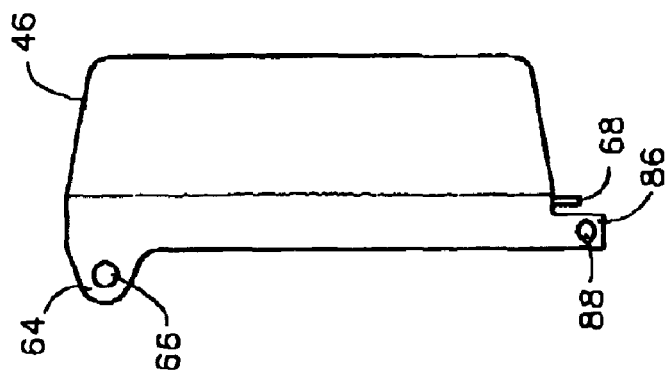
FIG. 9 is a side view of the cover member taken along line 9—9 of FIG. 8.
Figure 8:
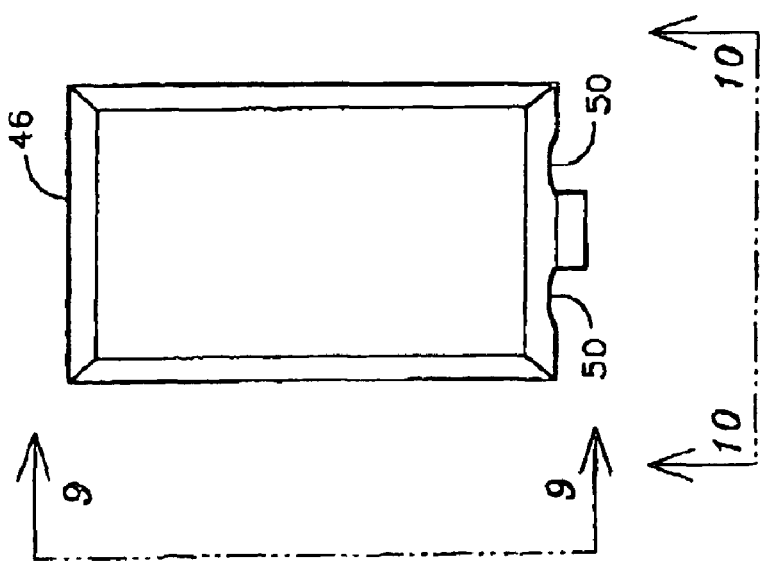
FIG. 8 is an elevation view of a preferred embodiment of a cover member according to the present invention.

With reference to FIGS. 8–10, the cover 46 includes bottom apertures 50 to allow passage of electrical cords (not shown) there through while the cover is in its closed position on the support (not shown). The cover 46 includes integral ears 64 with apertures 66 there through and a snap lock tab 68. Additionally, an integral tab 86 including an aperture 88 may be included on the cover 46 to provide an arrangement for locking the cover to the support. The cover 46 may be formed of clear plastic to allow viewing of the devices installed within the support while the cover is closed thereon.

Figure 11:
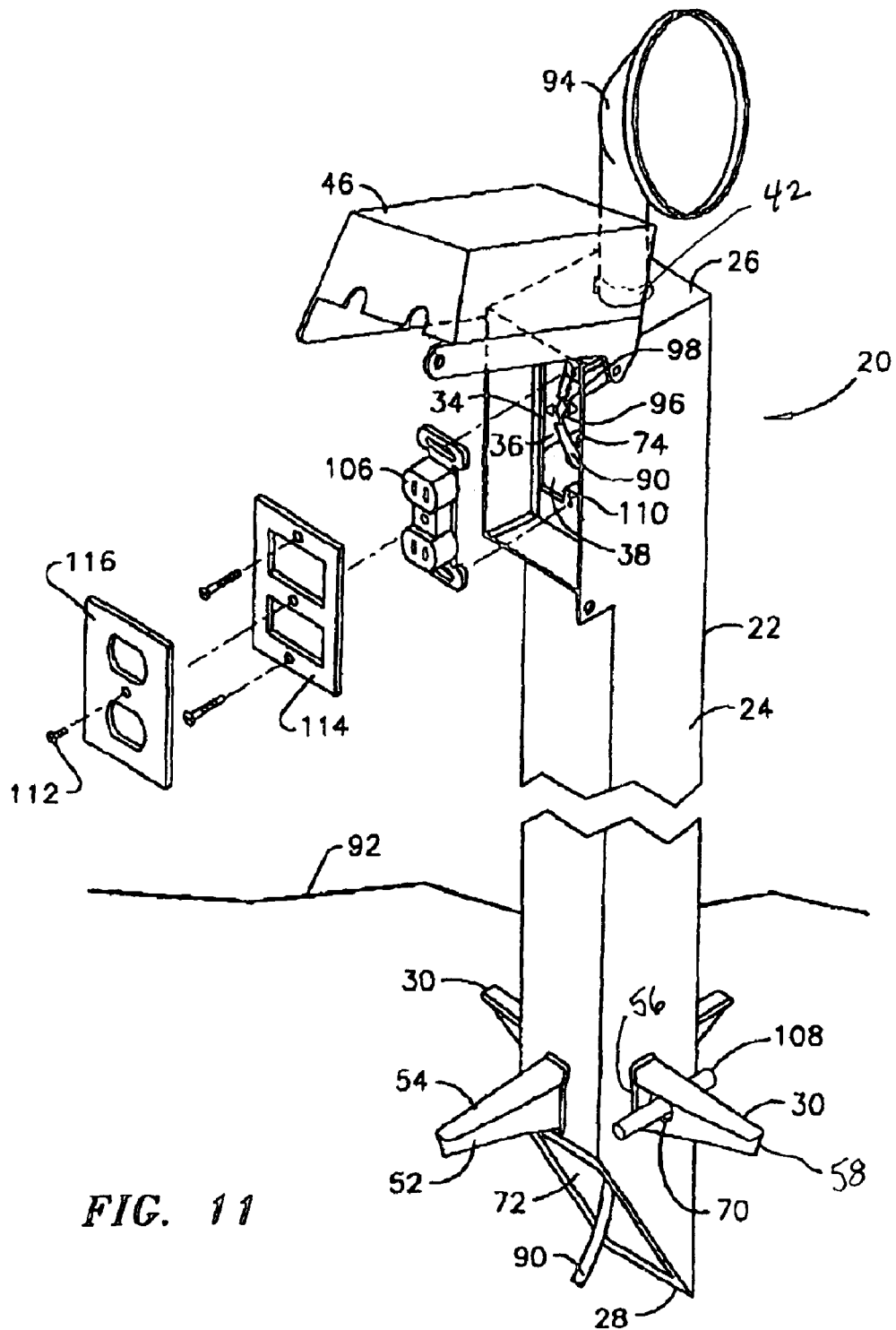
FIG. 11 is a perspective view of the support according to the present invention including a duplex receptacle mounted in the junction box and the cover member lifted on its hinges.

A typical installation of a support 20 for an outdoor light fixture according to the present invention is shown in FIG. 11. The support 20 is operated by first excavating a hole in the earth in the desired location for an electrical device such as a duplex receptacle, a light or similar electrical fixture, or a combination of both. The hole is made to a depth that will enable the integral stabilizer bars 30 to be covered with soil. The open bottom 28 of the elongated body 22 is then placed into the hole with the cable entryway 72 oriented toward the direction facing the electrical supply cable 90. The cable is fed into the cable entryway 72, through the hollow body 22, and through a knockout 74 in the closure panel 38 until a portion of the end of the cable 90 extends from the electrical junction box 36. The hole is filled with dirt, the dirt is compacted, and the resulting packed dirt around the stabilizer bars 30 and the buried portion of the body 22 anchor the support 20 firmly in the ground 92. The embodiment of the support 20 shown in FIG. 11 includes an electrically conductive bushing 42 that is threaded interiorly to ½-inch NPT. A light fixture 94 with a nipple threaded exteriorly to ½-inch NPT is then simply screwed into the electrically conductive bushing 42 on the closed top 26 of the elongated body 22. Other electrical fixtures could similarly be mounted to the top of the support 20, including a light combined with a photocell, a light combined with a switch, a motion detector, or a motion detector combined with a light (none shown). After the light fixture 94 is installed, electrical connections are made between the cable wiring leads 96 and the fixture wiring 98. An electrical device may then be installed in the electrical junction box 36, such as the duplex receptacle 106 shown installed in the junction box 36 in FIG. 11, and the wiring leads connected as shown.

Referring to FIG. 4, an aperture 40 is provided in the closed top 26 and is typically threaded interiorly to ½"-NPT threads to accept the mounting nipple on most standard electrical fixtures (not shown). Alternatively, the aperture 40 in the closed top 26 may include an electrically conductive bushing 42 inserted therein and secured thereto with an electrically conductive nut 100. The electrically conductive nut 100 can also include a grounding lug 102 and a ground wire 104 for grounding an attached electrical fixture (not shown).

Referring to FIG. 2, the stabilizer bars 30 are wide at their base 56 and are tapered in width from the base to their distal ends 58. The stabilizer bars 30 are preferably of a length as long or longer than the exterior width of the elongated body 22. Each stabilizer bar 30 includes a stiffening rib 54 along its top edge. The stiffening ribs 54 are aligned horizontally along the body 22 of the support 20 or at a 90° angle to the vertical component 52 of the stabilizer bar 30.

The open bottom 28 is typically formed at an angle preferably between 20° and 40° as denoted by the angle θ in FIG. 2. An especially preferred angle for θ is 30°. The base of each stabilizer bar 30 includes a periphery extending around the vertical component 52 and the stiffening rib 54 portion. Fillets 60 are formed substantially around the periphery of the base 56 during the molding of the unitary body 22 to further stiffen the stabilizer bars 30.

Figure 12:
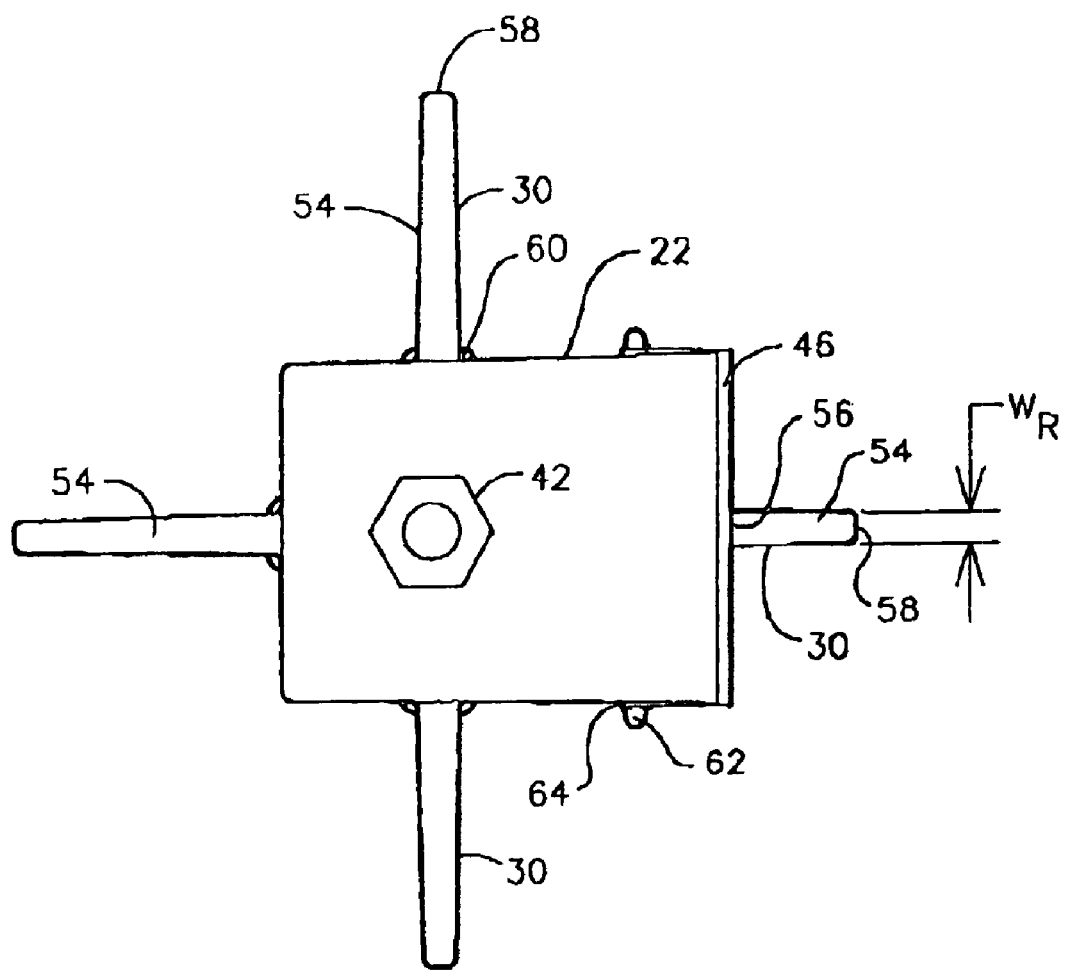
FIG. 12 is a top view of the support of FIG. 1.

As depicted in FIG. 12, the cross-sectional shape of the elongated body 22 is preferably rectangular. The exterior width of the rectangular body 22 is preferably 2.0 to 3.0 inches. The stiffening ribs 54 are preferably between 0.4 and 1.0 inch wide ($W_R$) at the distal end 58 of the stabilizer bars, and, more preferably, 0.6 inch wide.

With Reference to FIG. 1, by providing a sharply angled bottom 28, a wide cable entryway 72 is created for the entry of cable 90 therein. The cable entryway 72 is preferably between 2.0 and 2.4 inches wide and between 4.0 and 5.0 inches long and more preferably 2.2 inches wide by 4.5 inches long.

Packing the ground 92 around the lower portion of the support 20 and the stabilizer bars 30, as shown in FIG. 11, sufficiently anchors the support 20 securely in the ground. However, if additional anchoring is required, such as in sandy soils that do not compact well, rebar 108 or similar anchoring material may be inserted through the apertures 70 in the stabilizer bars 30. The apertures 70 in the stabilizer bars 30 preferably extend from near the bottom edge to the top edge of the bar 30 and are preferably from 0.4 to 0.70 inch in diameter, or more preferably about 0.63 inch in diameter. If buried in the ground without additional anchors through the stabilizer apertures 70, the large apertures typically enable a passageway for plant roots to grow there through and further anchor the support in the ground.

After being buried and secured to the ground, the assembly of the support 20 can be completed as shown in FIG. 11. The elongated body 22 and closure panel 38 secured thereto are typically provided with bosses 110 to accept fasteners 112 for attaching a gasket 114 and a faceplate 116 to seal the side opening 34.

FIG. 11 depicts the completed installation of a support 20 according to the present invention. The support is secured in the ground 92 by the earth packed around the lower portion of the body 22 and the integral stabilizer bars 30. The wiring and connections are protected within the interior of the support 20 by the faceplate 116 and compressed gasket 114 sealed around the side opening 34. The overall length of the elongated body 22 is preferably between 10 and 25 inches and, more preferably, 19.6 inches in length. The length between the base 56 and distal end 58 of the stabilizer bars is approximately the width of the exterior of the body 22 or preferably between 2.0 and 3.0 inches and, more preferably, 2.25 inches.

Referring to FIG. 2, the stabilizer bars 30 are preferably between 1.0 and 1.25 inches in width ($W_B$ in FIG. 2) at the base 56 and between 0.46 and 0.54 inches in width ($W_D$ in FIG. 2) at the distal end 58. More preferably, the stabilizer bars 30 are 1.125 inches in width at the base and 0.50 inch in width at the distal end 58. The body 22 of the support 20 is typically rigid and formed in an injection molding process in one piece and with a sufficient wall thickness to support the fixture and make it sturdy enough to resist lawn mowers or similar equipment when mounted in the ground. A presently preferred material for forming the body is plastic such as polyvinyl chloride, polycarbonate, or polyethylene. The elongated body 22 of the support 20 is molded of plastic with a wall thickness of preferably between 0.100 and 0.150 inch thick or, more preferably, 0.125 inch thick. The cover 46 is also typically molded of plastic. Pigments are typically added during the injection molding process to create a unitary body 22 that is colored throughout. The elongated body therefore does not exhibit discoloration from chipping.

The support of this disclosure is designed and constructed to accept line voltage, or 120 volt power, and fixtures requiring line voltage. However, it also may easily be used for low-voltage fixtures if preferred.

Suitable gasket materials may be any of the commonly available flexible waterproof materials, such as rubber (natural or synthetic), Neoprene™, Santoprene™, or other flexible resilient deformable plastic materials.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. A support for mounting electrical fixtures and devices in the ground, comprising:

a rigid, hollow, elongated rectangular body having integral side walls, an integral closed top, and an open bottom;

said open bottom formed along an angled plane that is between 20 and 40 degrees with respect to said side walls;

an electrical junction box formed by said closed top, said side walls, and a bottom closure panel secured to the side wall of said hollow body;

stabilizer bars integral with and projecting outwardly from said side walls at or near said open bottom;

said stabilizer bars including a vertical component and a horizontal component;

said stabilizer bars including a base portion having an outer periphery;

fillets formed around the periphery of said base portion;

at least one side opening in at least one of said side walls, said side opening for enclosing and securing an electrical device therein;

a peripheral flange surrounding said side opening and integral with and extending substantially from said side wall;

a cover secured to said peripheral flange and capable of moving between an open and a closed position;

bottom apertures in said cover, said bottom apertures allowing electrical cords to remain connected to said electrical device while said cover is rotated between said open and said closed position;

a plurality of integral bosses including one at the upper end of said side opening and one at the lower end of said side opening with each of said bosses including one or more apertures for securing thereto a gasket and a face plate; and an arrangement for allowing movement of said cover from said closed position to said open position;

whereby said support may be buried in the ground to an extent that said stabilizer bars are completely covered by soil and thereby enable said support to be stable in the ground and said peripheral flange and said cover provide protection against rain to said side opening and said electrical device.

2. The support of claim 1 wherein said arrangement for allowing movement of said cover is a hinge connecting said cover to said peripheral flange.

3. The support of claim 1 wherein said closure panel is secured within the interior of said hollow body at the bottom of said side opening to form a short electrical junction box.

4. The support of claim 1 wherein said closure panel is secured within the interior of said hollow body at the top of said open bottom to form a long electrical junction box.

5. The support of claim 1 wherein said rigid body is molded in one piece of a suitable plastic.

6. The support of claim 5 wherein said plastic is polyvinyl chloride or polycarbonate.

7. The support of claim 1 further including an aperture in said closed top and an electrically conductive bushing secured in said aperture.

8. The support of claim 7 wherein said bushing is threaded interiorly to ½" NPT threads.

9. The support of claim 7 wherein said electrically conductive bushing inserted in said aperture is secured thereto with an electrically conductive nut.

10. The support of claim 1 wherein said elongated body is preferably between 10 and 25 inches in length.

11. The support of claim 1 wherein said exterior width of said rigid body is preferably 2.0 to 3.0 inches.

12. The support of claim 1 wherein said stabilizer bars project outwards from said side walls preferably between 2.0 and 3.0 inches.

13. The support of claim 1 wherein said open bottom is formed by said side walls cut at an angled plane, the angle of said angled plane is preferably between 20 and 40 degrees with respect to said side walls.

14. The support of claim 1 wherein said stabilizer bars include a base at the juncture with said side walls and a distal end, said stabilizer bars are preferably between 1.0 and 1.25 inches in width at said base and between 0.46 and 0.54 inches in width at said distal end.

15. The support of claim 1 wherein said horizontal component is preferably between 0.40 and 1.0 inch wide.

16. The support of claim 13 wherein said open bottom formed by said angled preferably between 2.0 and 2.4 inches wide and between 4.0 and 5.0 inches long.

17. The support of claim 1 wherein said side walls are preferably between 0.100 to 0.150 inch thick.

18. The support of claim 1 wherein said stabilizer bars include apertures therein.

19. The support of claim 2 including a wide cable entryway at said open bottom formed along an angled plane.

20. The support of claim 2 wherein said arrangement for allowing movement of said cover includes posts extending from opposing sides of said peripheral flange;

ears integral with said cover; and apertures in said ears that align with said posts.

21. The support of claim 1 wherein said cover includes a snap lock tab that enables snap fitting of said cover to said peripheral flange when said cover is closed thereon.

22. The support of claim 1 wherein said closure panel includes a bottom side;

a lip extending from said bottom side;

two panel bosses extending from said bottom side;

a gap formed between said lip and said panel bosses; and coaxial apertures in said lip and said panel bosses;

whereby the gap and closure panel is placed over the side wall of said support enabling fasteners to be inserted through said coaxial apertures, said side wall, and tightened into said panel bosses thereby securing said closure panel to said support.

\* \* \* \* \*